United States Patent [19]
Eldridge

[11] 3,955,067
[45] May 4, 1976

[54] FAT FRYING TIMING SYSTEM

[75] Inventor: Brice Eldridge, Reston, Va.

[73] Assignee: Steak n Shake, Inc., Indianapolis, Ind.

[22] Filed: Mar. 5, 1975

[21] Appl. No.: 555,401

[52] U.S. Cl. .............................. 219/497; 219/499; 219/501
[51] Int. Cl.² .......................................... H05B 1/02
[58] Field of Search ........... 219/490, 492, 494, 497, 219/499, 501, 504, 505, 216, 469, 471; 307/310

[56] References Cited
UNITED STATES PATENTS

| | | | |
|---|---|---|---|
| 3,553,429 | 1/1971 | Nelson | 219/497 |
| 3,588,445 | 6/1971 | Hopkins | 219/469 |
| 3,814,957 | 6/1974 | Way | 307/310 |
| 3,869,597 | 3/1975 | Strange | 219/497 |

Primary Examiner—J. D. Miller
Assistant Examiner—Fred E. Bell
Attorney, Agent, or Firm—Jenkins, Hanley & Coffey

[57] ABSTRACT

An electronic timing system for timing a frying cycle of a fat frying apparatus includes means for adjusting the timing cycle for variations in the temperature of the fat or oil used in the fryer. The temperature adjusting portion of the system includes a thermistor mounted in a probe immersed in the fat or oil. The thermistor is one leg of a resistance bridge. The bridge is coupled across a comparator which senses the output voltage therefrom and generates an output signal which varies with temperature. This temperature-related output signal is compared in a second comparator with the voltage across a charging capacitor in a resistance-capacitance network. When the charging voltage from the resistance-capacitance network exceeds the temperature-related output signal, the second comparator generates a signal which indicates that the frying cycle is completed.

7 Claims, 1 Drawing Figure

U.S. Patent May 4, 1976 3,955,067
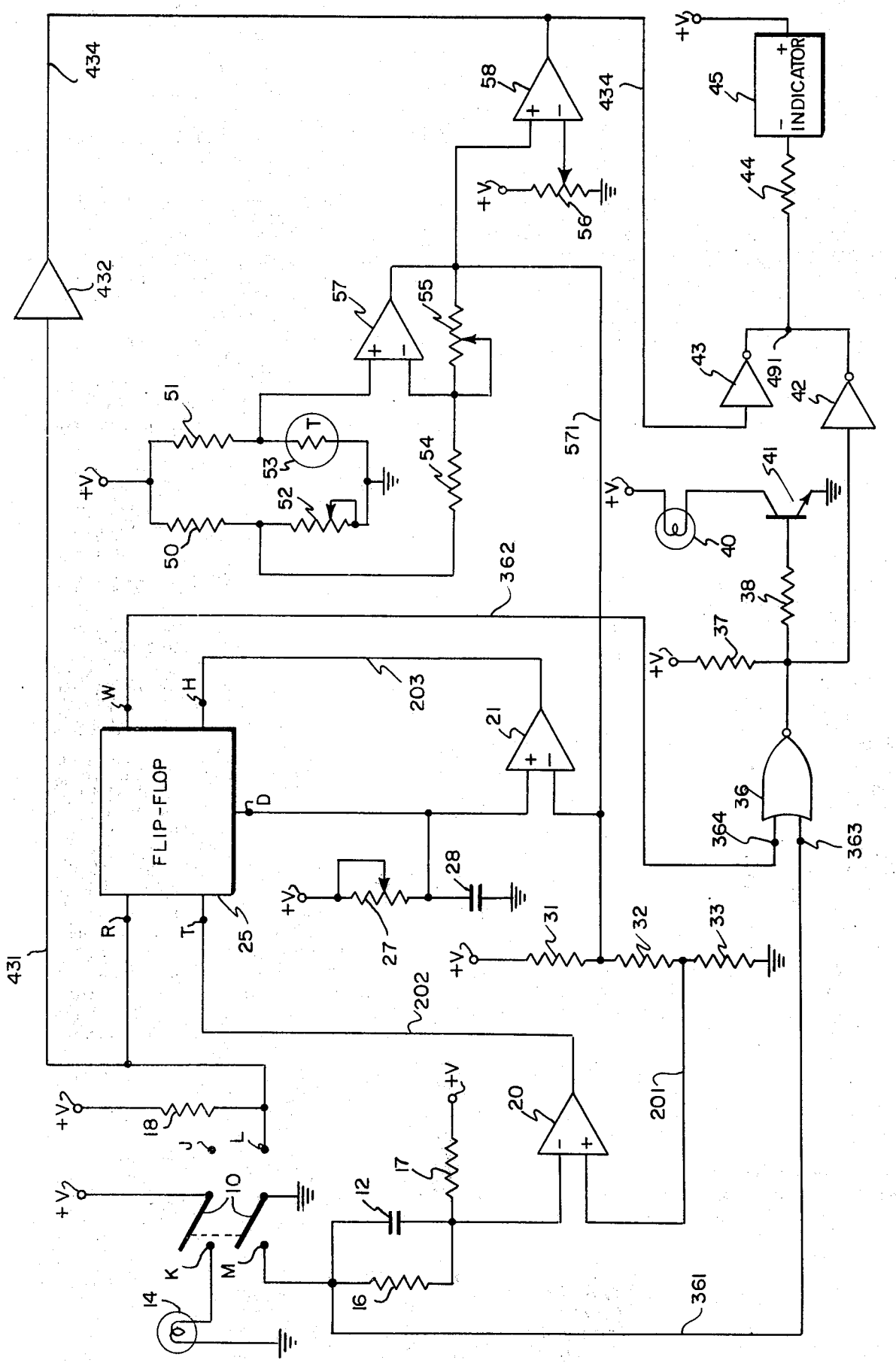

FAT FRYING TIMING SYSTEM

BACKGROUND OF THE INVENTION

This invention relates to a temperature sensing and frying time cycle adjusting electronic circuit for use with a fat fryer.

Many restaurants and food services use deep fat fryers for preparing French fried potatoes, fried chicken, donuts, and other fried foods. These frying mechanisms include means for heating a fat or oil in a container. Food to be fried is then placed in the container for a predetermined frying time. One or more timing mechanisms are frequently attached to the apparatus for timing the frying cycle of the food to be fried. Such apparatus also frequently contains some sort of overtemperature control mechanism for preventing the fat or oil from becoming too hot. Preventing the frying fat or oil from overheating decreases the likelihood of fire, increases the useful life of the fat or oil used, and helps control the temperature at which the food is fried, thereby preventing burning or overheating of the food itself during the frying cycle.

Such systems generally employ mechanical or electrical timers to time the frying cycle and temperature sensors mounted in intimate contact with the heated container or mounted in probes immersed in the frying fat or oil to sense fat temperature. The temperature sensor mechanism generally operates independently of the timer mechanism. Typically, fat in such systems must reach a fairly constant temperature before the system is put to use. It may take the equivalent of several frying time cycles for the fat temperature to stabilize and much time may be required before any food is fried. However, by incorporating the temperature sensing and timing functions in a single electrical system, the apparatus required for achieving the two necessary functions of timing and temperature sensing can be simplified. A significant advantage which is made possible by combining the timing and temperature sensing functions is that the timing cycle can be varied with changes in the fat temperature. For example, if the fat temperature increases during a frying cycle, it would be possible to automatically decrease the length of the timing cycle to compensate therefor. Conversely, if the fat temperature should decrease, the timing cycle would automatically increase in length.

SUMMARY OF THE INVENTION

In accordance with the invention, a fat frying cycle timing system includes time constant charging means for producing a charging signal representative of elapsed time from the beginning of the frying cycle and temperature sensing means adapted for sensing the temperature of the fat. Means are coupled to the temperature sensing means for producing a signal representative of the temperature sensed thereby. Electronic circuit means are coupled to the means for producing the signal representative of temperature and to the time constant charging means for producing a signal indicative of completion of the timing cycle and for varying the length of the timing cycle in response to the signal representative of the fat temperature.

BRIEF DESCRIPTION OF THE DRAWING

The accompanying drawing illustrates the invention in which the single FIGURE is a partly schematic and partly block diagram of a fat frying cycle timing system embodying the invention.

DESCRIPTION OF THE PREFERRED EMBODIMENT

In the drawing, direct current operating voltage from a voltage supply +V is coupled to one throw of a double pole-double throw switch 10. The remaining throw of switch 10 is coupled to ground. In a first position of switch 10, the +V voltage supply is coupled to a terminal J and ground is coupled to a terminal L. In a second position, the +V voltage supply is coupled to a terminal K and ground to a terminal M.

Terminal J is not coupled in circuit. Terminal L is coupled through a resistor 18 to voltage supply +V and to a resetting input terminal R of a flip-flop 25. Terminal K is coupled to one terminal of a lamp 14, the remaining terminal of which is coupled to ground. Terminal M is coupled to one terminal of a parallel resistor-capacitor network comprising a resistor 16 and a capacitor 12. The remaining terminal of the parallel resistor-capacitor network is coupled to a "minus" input terminal of a comparator 20 and to voltage supply +V through a series resistor 17. Terminal M is also coupled through a conductor 361 to an input terminal 363 of a NOR gate 36.

Resetting input terminal R of flip-flop 25 is coupled through a conductor 431 to the input terminal of an isolation amplifier 432. The output terminal of amplifier 432 is coupled through a conductor 434 to the input terminal of an inverting amplifier 43. The output terminal of inverting amplifier 43 is coupled through a terminal 491 and a series resistor 44 to the "minus" terminal of an indicator 45. The "plus" terminal of indicator 45 is coupled to voltage supply +V. Indicator 45 may be an audio alarm such as a model AI-101 manufactured by Projects Unlimited of Dayton, Ohio, or it may be some other suitable type of indicator.

The output terminal of NOR gate 36 is coupled through a series load resistor 37 to a supply voltage +V. The output terminal of NOR gate 36 is also serially coupled through a base-protecting resistor 38 to the base of a transistor 41. The emitter of transistor 41 is grounded and its collector is coupled through a load in the form of a lamp 40 to supply voltage +V. The output terminal of NOR gate 36 is also coupled to the input terminal of an inverting amplifier 42. The output terminal of inverting amplifier 42 is coupled to the output terminal of inverting amplifier 43 at point 491.

The "plus" input terminal of comparator 20 is coupled through a conductor 201 to the junction of a resistor 32 and a resistor 33 which are coupled in series along with a resistor 31 between voltage supply +V and ground. The output terminal of comparator 20 is coupled through a conductor 202 to a trigger terminal T of flip-flop 25. An output terminal W of flip-flop 25 is coupled through a conductor 362 to an input terminal 364 of NOR gate 36.

The "minus" input terminal of a comparator 21 is coupled to the junction of resistors 31 and 32. The "plus" input terminal of comparator 21 is coupled to the junction of a capacitor 28 and a potentiometer 27. The other terminal of resistor 27 is coupled to the +V voltage supply, and the other terminal of capacitor 28 is coupled to ground. The junction of resistor 27 and capacitor 28 is also coupled to a discharge terminal D of flip-flop 25. The output terminal of comparator 21 is coupled through a conductor 203 to a threshold input terminal H of flip-flop 25. Comparators 20 and 21 and flip-flop 25 may be separate circuits or they may be combined in a single integrated circuit chip such as an NE 555 integrated circuit or one-half of an NE 556 integrated circuit, both of which are manufactured by SIGNETICS Corp. of Sunnyvale, California. When either of these integrated circuits is used, resistors 31, 32, and 33 also appear thereon.

A series resistive network comprising a resistor 50 and a potentiometer resistor 52 is coupled between voltage supply +V and ground as is a series network comprising a resistor 51 and a negative temperature coefficient thermistor 53. These four elements, 50–53, form a resistance bridge which is balanced at a desired temperature by adjusting potentiometer 52. Thermistor 53 may be one of several known types such as the 1H-104 manufactured by NL Industries, Inc., of Hightstown, New Jersey.

The junction of resistor 50 and potentiometer 52 is coupled through a series resistor 54 to the "minus" input terminal of a comparator 57. The junction of resistor 51 and thermistor 53 is coupled to the "plus" input terminal of comparator 57. The output terminal of comparator 57 is coupled back to the "minus" input terminal thereof through a feedback potentiometer 55. The output terminal of comparator 57 is also coupled to the "plus" input terminal of another comparator 58 and through a conductor 571 to the minus input terminal of comparator 21. The "minus" input terminal of comparator 58 is coupled to the adjustable contact of a potentiometer 56, the remaining terminals of which are coupled between supply voltage +V and ground. The output terminal of comparator 58 is coupled to conductor 434 which is coupled between the output terminal of isolation amplifier 432 and the input terminal of inverting amplifier 43.

In operation of the circuit, when switch 10 is in contact with terminals J and L, lamp 14 is off. Reset terminal R of flip-flop 25 is grounded. With terminal R grounded, discharge terminal D and output terminal W of flip-flop 25 are also both at low potential, e.g., zero volts, regardless of the condition of threshold input terminal H or trigger input terminal T of flip-flop 25. The low potential condition at terminal R of flip-flop 25 also appears at the input terminal of inverting amplifier 43, being coupled thereto by conductor 431, isolation amplifier 432 and conductor 434.

If either or both of input terminals 363 or 364 of NOR gate 36 is in a high potential condition, then the output terminal of NOR gate 36 is in a low potential condition. If both input terminals 363 and 364 of NOR gate 36 are at low potential, then the output terminal thereof is at high potential, e.g., five volts. With switch 10 in contact with terminals J and L, input terminal 363 of NOR gate 36 is coupled through conductor 361 and resistors 16 and 17 to supply potential +V, causing a high potential condition at terminal 363. As a result, a low potential condition exists at the output terminal of NOR gate 36.

Voltage is dropped from voltage supply +V through load resistor 37 to the low potential at the output terminal of NOR gate 36. The input terminal of inverting amplifier 42 is also at low potential. Thus, the output terminal of inverting amplifier 42 is at high potential. The high potential at the output terminal of inverting amplifier 42, combined with the high potential at the output terminal of inverting amplifier 43, results in a high potential at terminal 491 and at the "minus" terminal of indicator 45. Thus, no current will flow from voltage supply +V through indicator 45 to the "minus" terminal thereof. Thus, when switch 10 is in contact with terminals J and L, indicator 45 and lamp 40 are off.

With switch 10 in contact with terminals K and M, lamp 14 conducts from voltage supply +V indicating that the timing cycle is progressing. When switch 10 is switched into contact with terminals K and M, terminal L is no longer at low potential. Terminal L and resetting terminal R of flip-flop 25 are coupled through resistor 18 to high potential from voltage supply +V.

When reset terminal R of flip-flop 25 is placed in a high potential condition, discharge terminal D thereof is uncoupled from ground potential. Capacitor 28, which is coupled to discharge terminal D of flip-flop 25, begins to charge from voltage supply +V through potentiometer 27. The rate at which capacitor 28 charges through potentiometer 27 is variable by varying the resistance of potentiometer 27.

With reset terminal R of flip-flop 25 in a high potential condition, a high potential condition placed on trigger terminal T thereof for a brief time interval causes output terminal W of flip-flop 25 to go to a high potential condition until a high potential condition appears at threshold terminal H thereof. When a high potential condition appears at terminal H, terminal W is placed in a low potential condition until trigger terminal T of flip-flop 25 is again placed in a high potential condition for a brief time interval.

Thus, as resetting terminal R of flip-flop 25 is placed at high potential by switching switch 10 into contact with terminals K and M, discharge terminal D of flip-flop 25 is uncoupled from ground and capacitor 28 begins to charge. At the same time, capacitor 12, which previously was uncharged by virtue of both of its terminals being coupled to supply potential +V through resistors 16 and 17, is placed at ground potential through terminal M.

Comparator 20 is of a type which generates at its output terminal a high potential when the potential on its "plus" input terminal exceeds the potential on its "minus" input terminal. Thus, as the terminal of capacitor 12 which is coupled to terminal M is grounded, and capacitor 12 begins to charge through resistor 17, the potential which results at the "minus" input terminal of comparator 20 is reduced below the potential at the "plus" input terminal of comparator 20 for a brief time, until the potential across capacitor 12 exceeds the potential at the "plus" terminal of comparator 20. This decreased potential on the "minus" terminal of comparator 20 causes trigger terminal T of flip-flop 25 and thus output terminal W thereof to go the high potential.

As switch 10 is switched into contact with terminal M, input terminal 363 of NOR gate 36 is also coupled to ground through conductor 361. However, because output terminal W of flip-flop 25 and conductor 362 are still at high potential, input terminal 364 of NOR gate 36 is at high potential. The output terminal of NOR gate 36, therefore, remains at low potential. The input terminal of inverting amplifier 42 is still at low potential and its output terminal is still at high potential. The "minus" terminal of indicator 45 remains at high potential and indicator 45 does not conduct current since both its "plus" and "minus" terminals are at approximately the same potential.

As capacitor 28 charges, at some predetermined time determined from the charging time constant of the series combination of resistor 27 and capacitor 28, the voltage across capacitor 28 exceeds the voltage at the junction of resistors 31 and 32. Thus, the voltage at the "plus" input terminal of comparator 21 exceeds the voltage at its "minus" input terminal. At that time, the output terminal of comparator 21 goes to high potential. Threshold input terminal H of flip-flop 25 thus goes to high potential. In response to that high potential signal at terminal H thereof, output terminal W of flip-flop 25 goes to low potential.

This low potential condition is coupled by conductor 362 to input terminal 364 of NOR gate 36. The low potential conditions thus present on both input terminals 363 and 364 of NOR gate 36 cause the output terminal thereof to go to high potential. This high potential causes current to flow through resistor 38 and the base of transistor 41. Transistor 41 becomes conductive and lamp 40 is lighted, indicating the end of the timing cycle.

The high potential condition at the output terminal of NOR gate 36 is inverted in inverting amplifier 42 and a low potential results on the output terminal of inverting amplifier 42.

The occurrence of the low potential condition at the output terminal of inverting amplifier 42 and point 491 allows current to flow through indicator 45 and resistor 44 from voltage supply +V. Current flow through indicator 45 produces an audible indication of termination of the timing cycle. The lighting of lamp 40 and the audible alarm thus produced by indicator 45 warn the operator of the frying apparatus that food therein has finished frying.

In the event that the fat temperature exceeds a desired maximum, it is desirable to terminate the frying cycle and produce an indication thereof. It is further desirable to decrease the timing cyle as the temperature of the fat increases through periods of extended operation of the frying apparatus. To accomplish these results, negative temperature coefficient thermistor 53 is placed in the frying fat.

After a frying apparatus is switched on, and timing apparatus switch 10 is switched into contact with terminals K and M, fat in the frying apparatus begins to heat. During the first several timing cycles, the fat temperature increases. Thus, the temperature of a probe containing thermistor 53 immersed in the frying fat also increases and the resistance of thermistor 53 decreases.

The bridge comprising resistors 50, 51, and 52, and thermistor 53 will become increasingly unbalanced as the fat in which thermistor 53 is immersed becomes hotter. The effect of this unbalancing upon comparator 57 is to decrease its output voltage and output impedance as the potential on its "plus" terminal thereof decreases with respect to the potential on its "minus" terminal.

Since the output impedance of comparator 57 shunts resistors 32 and 33 through conductor 571, the voltage at the "minus" input terminal of comparator 21 decreases as the temperature of thermistor 53 increases. The decreasing of the potential at "minus" input terminal of comparator 21 results in the voltage across capacitor 28, which is coupled to "plus" input terminal of comparator 21, being compared to succeedingly lower voltage as the temperature of thermistor 53 increases. A high potential thus appears at the output terminal of comparator 21 with less voltage across capacitor 28 as the temperature of thermistor 53 increases.

This decreasing switching voltage across capacitor 28 corresponds to shorter frying cycle times since the appearance of a high potential at terminal H of flip-flop 25 results in the previously described indications that the frying cycle is completed. So as the fat temperature increases, the frying cycle decreases correspondingly. The desired relationship between changes in temperature of thermistor 53 and changes in frying cycle time may be selected by choosing from among negative temperature coefficient characteristics of available thermistors and by adjusting the ratio of feedback potentiometer resistor 55 to resistor 54.

If the resistance of the probe containing thermistor 53 decreases below a certain minimum value corresponding to maximum acceptable fat temperature, the voltage of the output terminal of comparator 57 decreases to its minimum value. This minimum potential output from comparator 57 is coupled through conductor 571 to the "minus" input terminal of comparator 21 and thence through resistor 32 and conductor 201 to the "plus" input terminal of comparator 20. Comparator 20 is thereby inhibited from further triggering of flip-flop 25 by the decreased potential at the junction of resistors 31 and 33.

Similarly, the significant reduction of the voltage at the "minus" input terminal of comparator 21 allows the high potential signal which indicates timing cycle termination to be generated at the output terminal of comparator 21 and threshold input terminal H of flip-flop 25. This causes the signal on output terminal W of flip-flop 25 to decrease to low potential resulting in decreased potential on conductor 362 and input terminal 364 of NOR gate 36. The output terminal of NOR gate 36 will therefore go to high potential and transistor 41 will become conductive, lighting lamp 40. Similarly, the output terminal of inverting amplifier 42 will go to low potential. The low potential resulting at terminal 491 will allow the "minus" terminal of indicator 45 to go to low potential. Indicator 45 will become conductive indicating that the fat frying timing cycle has been terminated. Lighting of lamp 40 and the audible warning from indicator 45 signify to the operator of the fryer that the timing cycle is completed and that the food in the fryer should be removed therefrom.

Comparator 58 generates a high potential condition at its output terminal when the voltage on its "minus" input terminal exceeds the voltage on its "plus" input terminal. The voltage on the "minus" input terminal of comparator 58 is variable by adjusting potentiometer 56. Potentiometer 56 is adjusted so that when the voltage at the output terminal of comparator 57 decreases to a minimum desired voltage, corresponding to the maximum desired temperature of thermistor 53 and minimum voltage on the "plus" input terminal of comparator 57, a high voltage condition appears at the output terminal of comparator 58. A high potential thus appears at the input terminal of inverting amplifier 43 which is coupled through conductor 434 to the output terminals of comparator 58 and isolation amplifier 432, both of which are in high potential condition. The output terminal of inverting amplifier 43 is thereby placed in a low potential condition.

Comparator 58 thus assists in generating a low potential condition at terminal 491 when the temperature of thermistor 53 exceeds the maximum desired temperature.

When the temperature of thermistor 53 is less than the maximum desired temperature, the voltage on the "plus" input terminal of comparator 57 exceeds the voltage on the "minus" input terminal thereof. Thus, the voltage on the "plus" input terminal of comparator 58 will exceed the voltage on the "minus" input terminal of comparator 58 and the output terminal of comparator 58 will be at low potential. The low potential condition on the output terminal of comparator 58 will appear at the input terminal of inverting amplifier 43, resulting in a high potential condition at the output terminal thereof. The low potential condition at the output terminal of comparator 58 will not affect the voltage at reset input terminal R of flip-flop 25 since isolation amplifier 432 is coupled between conductors 431 and 434 to isolate the low potential condition at the output terminal of comparator 58 from the high potential condition at terminal R of flip-flop 25.

What is claimed is:

1. A fat frying cycle timing system, comprising:
   charging means for producing a charging signal representative of elapsed time from the beginning of said cycle;
   temperature sensing means adapted for sensing the temperature of said fat;
   means coupled to said temperature sensing means for producing a signal representative of the temperature sensed thereby; and
   electronic circuit means coupled to said means for producing a signal representative of temperature and to said charging means for producing a signal indicative of completion of said timing cycle and for varying the length of said timing cycle in response to said signal representative of said fat temperature.

2. A fat frying timing cycle system according to claim 1 wherein said temperature sensing means comprises a resistance bridge, one leg of said bridge containing a temperature sensitive resistance element adapted for being immersed in said fat for causing said bridge to become progressively unbalanced as said fat temperature increases for decreasing said timing cycle and for becoming sufficiently unbalanced when said fat temperature exceeds a predetermined maximum temperature for causing said electronic circuit means to produce said signal indicative of completion of said timing cycle.

3. A fat frying cycle timing system according to claim 1 wherein said electronic circuit means includes a comparator having a first input terminal coupled to said means for producing a signal representative of said fat temperature and a second input terminal coupled to said charging means.

4. A fat frying cycle timing system, comprising:
   a time constant charging circuit;
   electronic circuit means coupled to said time constant circuit for generating an output signal when said time constant circuit charges to a reference voltage indicating passage of said cycle time; and
   temperature sensing means adapted for sensing the temperature of fat used for frying and for generating signals representative of temperature, said temperature sensing means being coupled to said electronic circuit means for varying said reference voltage and said cycle time in response to variations in said fat temperature.

5. A fat frying cycle timing system according to claim 4 wherein means are coupled to said electronic circuit means and responsive to said output signal for indicating completion of said fat frying cycle.

6. A fat frying cycle timing system according to claim 4 wherein said temperature sensing means includes a thermistor coupled in one leg of a resistance bridge for progressively unbalancing said bridge as said fat temperature increases and said temperature sensing means further includes electronic amplifier means coupled to said resistance bridge and to said electronic circuit means for amplifying signals from said unbalanced bridge and for producing said signals representative of said temperature.

7. A fat frying cycle timing system according to claim 6 wherein said electronic circuit means includes a comparator coupled to said time constant charging circuit and to said electronic amplifier for generating an output signal when said time constant circuit charging voltage exceeds said signal representative of said temperature.

\* \* \* \* \*